UNITED STATES PATENT OFFICE.

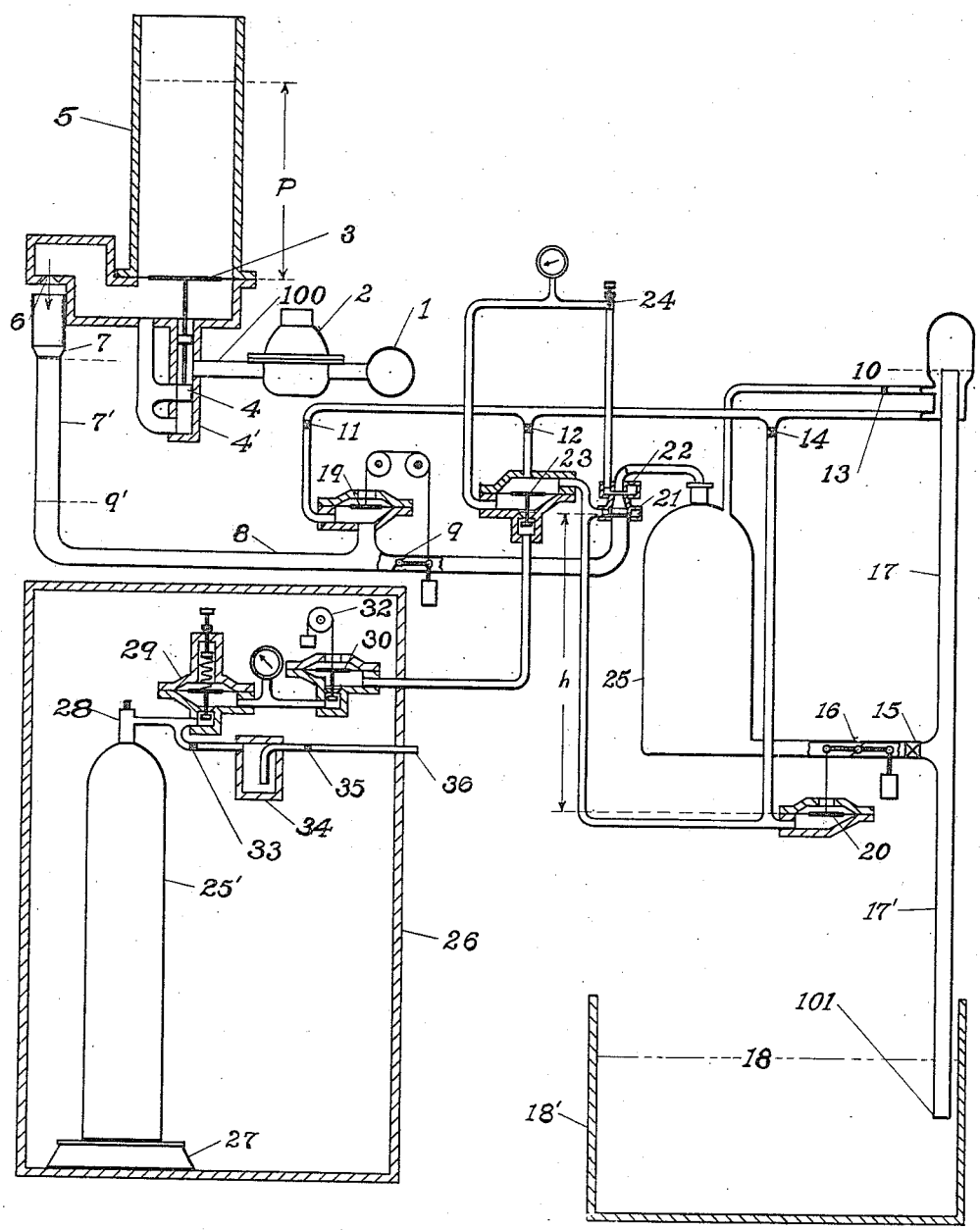

GEORGE GOODELL EARL, OF NEW ORLEANS, LOUISIANA, ASSIGNOR OF ONE-THIRD TO CHARLES ARTHUR BROWN, OF LORAIN, OHIO, AND ONE-THIRD TO ALBERT BALDWIN WOOD, OF NEW ORLEANS, LOUISIANA.

FLUID SYSTEM.

1,267,523.  Specification of Letters Patent.  Patented May 28, 1918.

Application filed March 2, 1917. Serial No. 151,968.

*To all whom it may concern:*

Be it known that I, GEORGE G. EARL, a citizen of the United States, residing at New Orleans, in the parish of Orleans and State of Louisiana, have invented certain new and useful Improvements in Fluid Systems; and I do hereby declare the following to be a full, clear, and exact description of the invention, such as will enable others skilled in the art to which it appertains to make and use the same.

My invention relates to improvements in fluid systems and more particularly to means and methods of adding a gas to a liquid.

One of the objects of my invention is to add or feed a dangerous gas, like chlorin, for example, to liquid, such as water, to be sterilized thereby.

In the systems employed for this purpose hitherto in use, so far as I am aware, the chlorin has been manipulated for these purposes under a positive pressure, with a result that it will escape from the apparatus in which it is manipulated, if there are any leaks anywhere in such apparatus, which generally do more or less occur. In escaping, the chlorin corrodes the material from which the apparatus is made and increases the size of the leaks, thereby exaggerating the escape of chlorin. Moreover, when chlorin is left in the apparatus when out of service, it will condense, creating a vacuum with a result that moisture will be drawn into the apparatus and combining with the chlorin, will form hydrochloric acid, which will eat additional holes into the apparatus, thereby creating additional leaks. In addition, the hydrochloric acid thus formed will destroy the various parts of the apparatus, such as valve seats, etc., and ultimately place it out of commission. The chlorin which escapes not only injures any apparatus associated with the chlorin apparatus which it engages, but is also injurious to the health of the attendants.

I aim to bring about practically the whole manipulation of the chlorin under negative pressure, thereby preventing the escape of the chlorin from any leaks in the apparatus in which it is handled and emptying such apparatus of all chlorin before placing it out of service.

While I have referred in this particular description more to chlorin gas, because its use is general and the troubles occurring with such use well understood, it is apparent that my invention may be used with any suitable gas which is to be fed to a liquid.

Another object of my invention is to feed a proportional flow of gas to a liquid under the conditions I have named and realizing the objects which I have set forth.

These and other objects of my invention, as well as its uses and the invention itself will be better understood from a description of an embodiment of the invention.

The figure in the drawing shows one embodiment of my invention.

Referring now to the drawing and to the embodiment of the invention shown therein, 1 is a suitable source of liquid supply, such as water. At 2 I show a meter for measuring the flow from said source through the duct 100. At 3 is a diaphragm operating a valve 4 to maintain a pressure over the orifice 6 equal to any required head P which may be set in the tank 5 over the diaphragm 3. Obviously any other suitable means furnishing a fixed or proportional supply of water to the funnel 7 can be used. From the orifice 6 the water is supplied to the funnel 7, as will be apparent from the drawing.

The flow into the funnel 7, if the valve 15 is closed and the valves 11, 12, 13 and 14 are open, will fill and submerge the whole system ahead of valve 15 to the level 10, overflowing the pipe 17 and passing to the outlet at 101 submerged by the water level 18. The water to which the chlorin is ultimately to be supplied is shown in the passageway 18'. If now the valves 11, 12, 13 and 14 are closed and the valve 15 is opened, the water flow will be controlled as follows: The diaphragm 19 having the pressure in the pipe 8 under it and atmospheric pressure above it, will operate the valve 9 to maintain a level 9' in the pipe 7', and the diaphragm 20 having the pressure from the approach 21 of the restriction 21—22 acting under it and atmospheric pressure above it, will maintain the pressure at 21 an amount below atmospheric pressure indicated by the distance $h$ which said diaphragm 20 is below said approach 21, utilizing the downdraft effect of the pipe 17' and the resistance of the valve 16 operated by the diaphragm 20 to maintain such constant pressure regulation.

The constant negative pressure at 21 is communicated also to the top side of the diaphragm 23 and acts through it to maintain an equal negative pressure of gas in the chamber under diaphragm 23, which pressure is effective on the orifice 24 to discharge gas therethrough, the lower pressure occasioned by the increased velocity of the flow of water at the restriction 22 resulting in a proportional flow of gas entering said throat and uniting with the water passing therethrough. The gas and water pass into the top of the chamber 25, which is preferably made of glass and of adequate area to produce low velocity and great agitation of water passing through the same, which results in the very rapid solution of the gas into the water. This solution passes through the regulating valve 16 and the down-draft 17' to the main flow of water to be treated at 18.

The high pressure gas may be stored in a tank 25', preferably supported on a platform shown at 27 in a separate inclosure, whose walls are indicated by the line 26. This gas may be brought to an approximately low pressure by the ordinary pressure reducing valve 29 and reduced to a pressure at or slightly below atmosphere by the equal pressure valve 30.

When it is desired to put the apparatus out of service, the main gas supply valve 28 is closed and the valves 33 and 35 opened, resulting in a free flow of air through the whole portion of the system through which the gas from the tank 25' had passed. Means may be provided to dry the air which is drawn through the apparatus in this manner; for example, I may employ a chamber 34 which may be provided with a drying agent.

In the embodiment shown, the reduction in pressure to the amount $h$ below atmosphere pressure at 21, in the system shown in the drawing, is due to the weight of the column of water from the level 21 down to the level 18 less the difference of level between the diaphragm 20 and the water level 18 occasioned by the throttling effect of the valve 16 operated by diaphragm 20, the system being full of water from level 21 to level 18. A reduction of pressure is attained at 22, due to the increased velocity obtained there by the restriction 22. The diaphragm 23 is placed at the level of the opening into the restriction 22.

Where I have used the term positive pressure herein, I have meant pressure higher than atmospheric pressure, and where I have used negative pressure, I have meant pressure less than atmospheric pressure.

In case of air leaks during the operation, any of the valves 11, 12, 13 and 14 may be opened slightly and result in drawing any such accumulations of air out of the system and discharging said air through the pipe at 10 to the low pressure side of the valve 16.

I have illustrated and described this particular embodiment of my invention and its details for the purpose of describing the invention. I do not wish to be limited to such embodiment and details, as obviously many departures may be made therefrom without departing from the spirit of my invention.

I claim:

1. The method of feeding gas to a liquid, which consists in establishing a flow of liquid under negative pressure and adding the gas to the liquid of said flow at said negative pressure.

2. The method of feeding gas to a liquid, which consists in establishing a flow of liquid under a negative pressure, adding the gas to the liquid of said flow at a negative pressure and adding the resulting solution of gas and liquid to the liquid to be fed with the gas.

3. The method of feeding gas to a liquid, which consists in establishing a flow of liquid under negative pressure, establishing a proportional flow of the gas to be fed to the liquid and adding said proportional flow of gas to the liquid at said negative pressure.

4. The method of feeding chlorin gas to water, which consists in establishing a flow of water under negative pressure, establishing a proportional flow of chlorin gas and adding said proportional flow of gas to the flow of water at said negative pressure.

5. The method of feeding gas to water flow, which consists in establishing a flow of water, maintaining the pressure in said water flow constant at one point in said flow, maintaining the pressure of said flow at another point at a constant negative pressure, establishing a flow of gas, maintaining the pressure in said gas flow at one point therein constant and negative and adding said gas flow to said water at a pressure below said constant negative pressures.

6. The method of feeding gas to water, which consists in establishing a flow of water, maintaining a constant negative pressure at one point in said water flow, establishing a flow of gas, maintaining a constant negative pressure at a point in said gas flow and adding said gas to said water at a pressure lower than said constant negative pressure.

7. The method of feeding gas to liquid, which consists in establishing a negative pressure of both gas and liquid and introducing one to the other at a pressure lower than either of said negative pressures.

8. The method of adding a proportional flow of chlorin to water, which consists in establishing a flow of water, maintaining a constant negative pressure in said water flow, establishing a chlorin flow and maintaining the chlorin flow proportional to the water flow, establishing in said chlorin flow a constant negative pressure and adding said chlorin to said water at a pressure below either of said constant negative pressures.

9. The method of adding a proportional flow of gas to a flow of liquid, which consists in establishing a flow of liquid, establishing and maintaining a constant pressure at one point in said flow of liquid, establishing and maintaining a constant negative pressure in said liquid at a point below the first named point, establishing a flow of gas, maintaining said gas flow proportional to the liquid flow by said liquid flow, establishing and maintaining said gas flow at a constant negative pressure at a point in said flow and adding said gas flow to said liquid flow at a pressure lower than either of said constant negative pressures.

10. The method of adding gas to liquid, which consists in establishing a flow of liquid, establishing a flow of gas, maintaining said gas flow proportional to said liquid flow by said liquid flow, maintaining a negative pressure at a point in said flow, adding said gas to said flow at said point of negative pressure and feeding the resulting solution of gas and liquid to the liquid to be fed with the gas.

11. The method of adding gas to liquid, which consists in establishing a flow of liquid, establishing a flow of gas, creating in said flows a common point of negative pressure and adding said gas flow to said liquid flow at said common point of negative pressure.

12. The method of adding gas to liquid, which consists in establishing a flow of liquid, establishing a flow of gas, maintaining the gas flow proportional to the liquid flow, creating in said flows a common point of negative pressure and adding said gas flow to said liquid flow at said common point of negative pressure.

13. The method of adding gas to liquid, which consists in establishing a liquid flow, establishing a gas flow, utilizing the liquid pressure of said liquid flow to maintain the gas flow proportional to the liquid flow, establishing equal constant negative pressures in each flow and uniting said flows at a common point therein, maintained at a lower negative pressure than the aforesaid negative pressure.

In witness whereof, I have signed my name hereunto this 16th day of February, 1917.

GEORGE GOODELL EARL.